FACSIMILE METHOD AND APPARATUS FOR SETTING WHITE LEVEL

BACKGROUND OF THE INVENTION

This invention relates to facsimile transmitters and/or transceivers of the type utilized to transmit information-bearing signals representing the dark/light variations on a document located at a transmitter or transceiver and converting the information-bearing signals to marks or images on a copy medium located at a receiver so as to form a copy which is a reasonable facsimile of the original document.

It is common in facsimile apparatus to set a predetermined voltage or current level which represents white on a document. Typically, this predetermined voltage or current level is set at the factory. However, as the light source of a scanner ages, the scanner phototransistor ages and the alignment between light source and phototransistor changes, the magnitude of the predetermined voltage or current level will vary and the preset light level will no longer be appropriate.

Heretofore, it has been suggested that the document should be preliminarily scanned so as to determine characteristics so as to appropriately set the white gain of the transmitter amplifier means. However, such preliminary scanning can be time consuming, and the consumption of time can be extremely undesirable in unattended facsimile transmitters wherein the time consumed between transmissions should be minimized. Moreover, the gain itself in prior art facsimile transmitters may be subject to some drift even over a relatively short period corresponding to the time required to scan a single document.

In general, it is desirable to achieve the maximum output from a facsimile transmitter which is allowed by the rules and regulations of the FCC for purposes of transmission over the telephone network. In a typical facsimile transmitter, the output from the transmitter when set at the factory may not be maximized for a given document. In other words, a given document may have a characteristic which will not permit the full output of the transmitter to be utilized.

SUMMARY OF THE INVENTION

It is an object of this invention to provide a facsimile transmission method and apparatus which is substantially independent of the aging of light sources, optics, phototransistors or other sensor and the alignment between the light sources and phototransistors.

It is a more specific object of this invention to provide a facsimile transmission method and apparatus which is adaptive to a particular document being transmitted.

It is another object of this invention to achieve the foregoing objects without creating undesirable delays.

It is a further object of this invention to achieve the foregoing objects in a reliable manner.

In accordance with these and other objects of the invention, a facsimile transmission apparatus comprises scanning means for scanning a document, sensor means for sensing dark/light variations on a document and variable gain amplifier means.

Prior to transmission, prescanning is initiated with the scanning means in an initial position. The document is prescanned from the first direction toward a second position. During prescanning, the gain of the variable gain amplifier means is set. Once the scanning means has reached a second position, scanning may proceed in a second and opposite direction from the second scanning means toward the first scanning means. During scanning, amplified signals are generated by the variable gain amplifier means representing the dark/light variations in the document.

In the preferred embodiment of the invention, the first position of the scanning means is at one extremity of the document and the second position is at the second extremity of the document.

In accordance with another important aspect of the invention, a binary word is stored representing the gain of the variable gain amplifier means during prescanning. This binary word may be updated and changed during prescanning as various levels of white are detected.

In the preferred embodiment of the invention, the variable gain amplifier means are utilized in combination with gain control means. The gain control means comprises a register which stores the binary word representing the gain. The variable gain amplifier means comprises an digital-to-analog converter having an analog input, a digital input and an analog output. The analog input is coupled to the sensor means. The digital input is coupled to the digital register. The output from the digital-to-analog converter is a signal representing the product of the binary word and the signal applied to the analog input.

In the preferred embodiment, the gain control means may comprise means for generating pulses and gate means for selectively applying the pulses to the register means during prescanning when the output of the digital-to-analog converter exceeds a predetermined level corresponding to a white level set. The gain control means may further comprise comparator means having one input coupled to the output of the analog-to-digital converter, another input coupled to a reference voltage and an output coupled to and enabling the gate means.

BRIEF DESCRIPTION OF THE DRAWINGS

FIG. 1a is a partial perspective view of the scanning means shown in FIG. 1 in another position; and FIG. 2 is a block diagram of the variable gain circuit shown in FIG. 1.

DETAILED DESCRIPTION OF A PREFERRED EMBODIMENT

Figure 1:
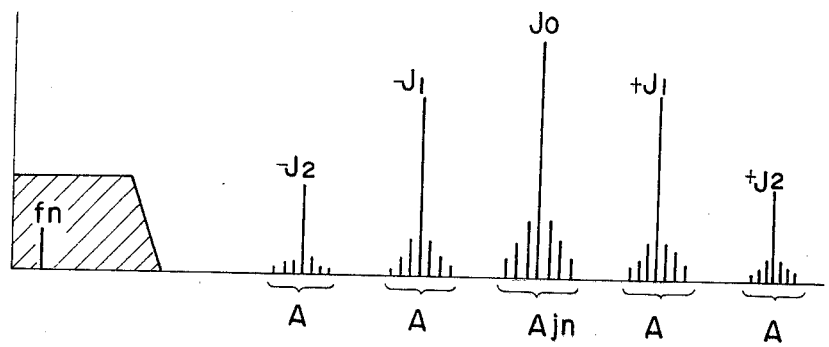
FIG. 1 is a partially schematic block diagram illustrating a preferred embodiment of the invention.

Referring to FIG. 1, a facsimile transmitter or a transmission portion of a facsimile transceiver is shown as comprising a scanning means 10 including a rotatable drum 12 capable of rotation in a direction indicated by an arrow 14 when driven by a motor 16. A head 18 is juxtaposed to the drum 12 and moves in both of two rectilinear directions as depicted by arrowheads 20 and 22. The head which includes suitable optical means for sensing dark/light variations in a document carried by the drum 12 is mounted on a belt 24 which moves around pulleys 26 and 28 when the pulleys are advanced by a motor 30. The motors 16 and 30 are both connected to motor drive circuitry 32 and 34 respectively which are under the control of a microprocessor 36.

As mentioned above, the head 18 includes optics for detecting dark/light variations. These optics are coupled to suitable sensors such as a phototransistor which generates a signal representing the dark/light variations which is applied to a preamplifier 38 having an output coupled to a variable gain circuit 40. The output from

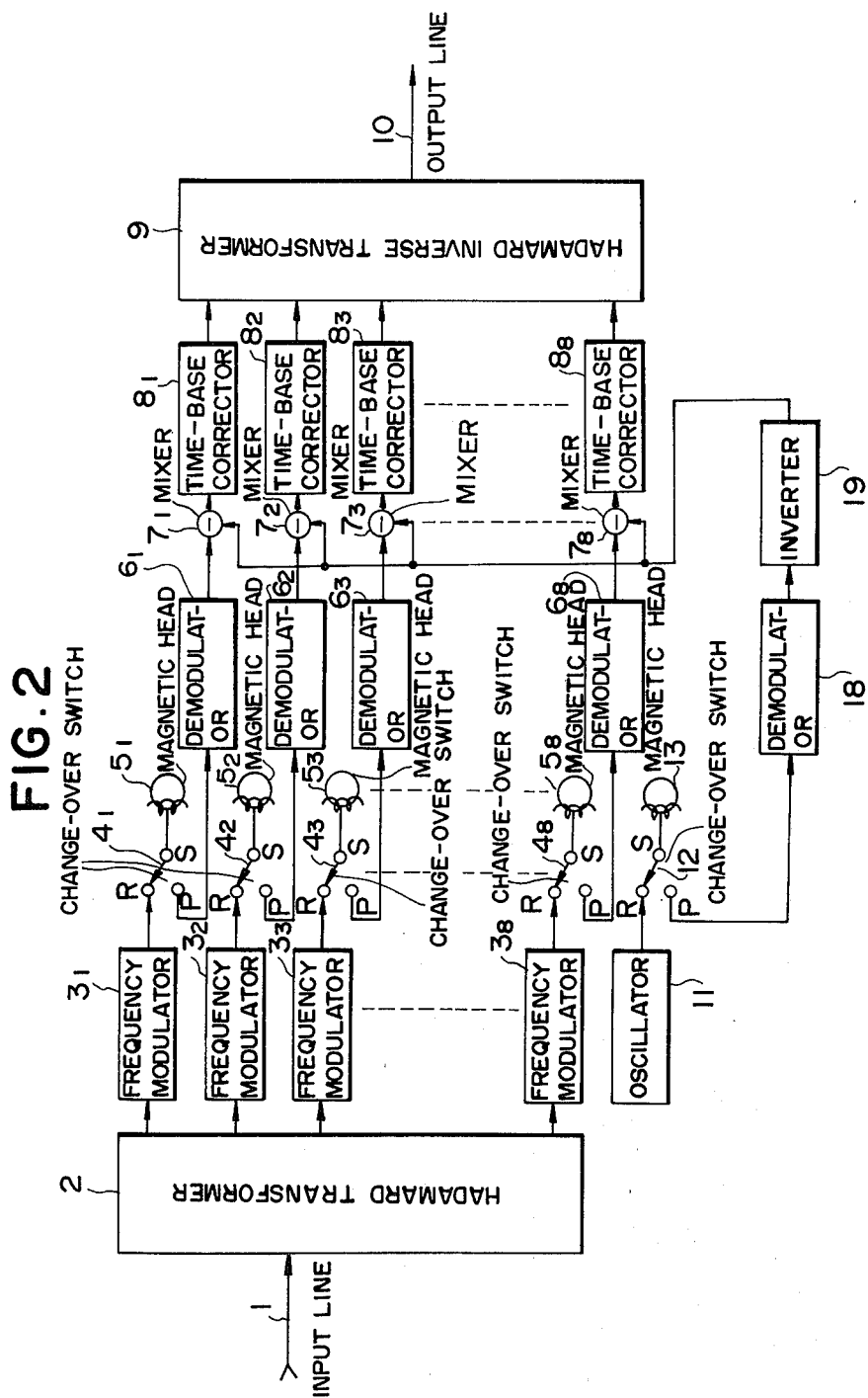

VIDEO TAPE RECORDING AND REPRODUCING APPARATUS WITH LINE BASE CORRECTION

BACKGROUND OF THE INVENTION

1. Field of the Invention

The present invention relates to video-tape recording and reproducing apparatus, and more particularly to video-tape recording and reproducing apparatus in which multi-channel transformer signals are obtained from field signals by band limiting using the Hadamard Transformation System or the Time Sharing System, and which can eliminate noise caused by tape travel irregularity (unbalanced), etc., where recording and reproduction of the multi-channel transformer signals is achieved using a fixed multi-channel head.

2. Description of Prior Art

It is generally accepted that, compared with other video-tape recording and reproducing systems, such as the helical scan system, the fixed multi-channel head system is more susceptible to the effects of tape travel jitter. This is particularly so where there is a high frequency component (over several hundred Hertz) in the frequency component of the tape travel jitter. Additionally, because of the special differential characteristics of magnetic head recording and reproduction, the recording and reproduction of direct current component, which the transformer signal includes, is difficult. So, generally speaking, the transformer signal is used to frequency modulate the carrier wave, and the frequency modulated carrier wave can be recorded and reproduced. However, FM modulation and demodulation produces differential characteristics in the carrier wave phase variations.

Therefore, the jitter high frequency component can adversely affect the signal level of the demodulation signal (hereinafter called the AM component), and the jitter low frequency component can adversely affect the time base variation component of the demodulation signal (hereinafter called the PM component). With regard to the latter, PM, component, by using the conventional time base corrector system, it is possible to negate the adverse effect, but with regard to the former, AM, component, no countermeasure has up to now been available.

FIG. 1 shows how modulation noise is caused by the jitter component. $J_0$, $+J_1$, $+J_2$, $-J_1$, $-J_2$ represent a frequency spectrum of an FM carrier wave. For example, let the jitter component be a single frequency, $f_n$; then, it modulates according to the spectrum shown in FIG. 1A, and this appears and the $J_n$ component as modulation noise when demodulated. In FIG. 1, the hatched area represents the passing zone in demodulation. The existence of the $f_n$ component in this zone, by demodulation as the $J_n$ component, is the cause of inferior SN ratio in video reproduction quality.

Also, in the case of video recording and reproduction of the numerous Hadamard Transformer signals generated by the Hadamard Transformer System through a frequency modulation system, there is a channel which is especially easily affected by tape travel modulation noise. As is already known, in Hadamard Transformation, each channel has its own frequency band. Moreover, the transformer signal frequency is also different, and there is a channel which includes low frequency components such as direct current components.

Generally speaking, the frequency component of the modulation noise caused by tape travel is largely distributed in the region of a few Hertz to a few tens of Hertz. Therefore, where the noise component is mixed into reproduced demodulation signals of the low frequency channels, which includes direct current components, it is extremely difficult to seperate the modulation noise from the signal frequency, as the signal frequency and the modulation noise frequency are so similar.

SUMMARY OF THE INVENTION

An object of the present invention is to eliminate the above-described disadvantages of the video-tape recording and reproducing apparatus.

Another object of the present invention is to provide video-tape recording and reproducing apparatus which can eliminate modulation noise caused by jitter AM components, and to obtain high quality video reproduction.

In addition, a further object of this invention is to provide video-tape recording and reproducing apparatus which can obtain high quality field signals by controlling the influence of tape travel modulation noise on channels easily affected by such noise.

According to the present invention a video-tape recording and reproducing apparatus comprises: a transformer system to divide the field signal into multi-channel transformer signals; a system to record and reproduce these multi-channel transformer signals using a multiple magnetic head; a jitter detection head to record and reproduce fixed frequency signals placed in juxtaposition with the above-mentioned magnetic head; and a system to mix the jitter component signal produced by the jitter detection head, after pole reversal, into each channel of the above-mentioned transformer signal.

The above-mentioned transformer system uses the Hadamard Transformation System or the Time Sharing System.

Also, the above-mentioned jitter detection head is positioned to correspond with the centre of the tape width.

Furthermore, the magnetic heads which record and reproduce the signals of the channels easily affected by jitter component signals are positioned in close proximity to the above-mentioned jitter detection head.

BRIEF DESCRIPTION OF THE DRAWING

FIG. 1 is an explanatory drawing which serves to illustrate that modulation noise is caused by the jitter component, in existing video-tape recording and reproducing apparatus.

FIG. 2 is a block diagram which serves to illustrate an embodiment of the present invention.

Figure 3:
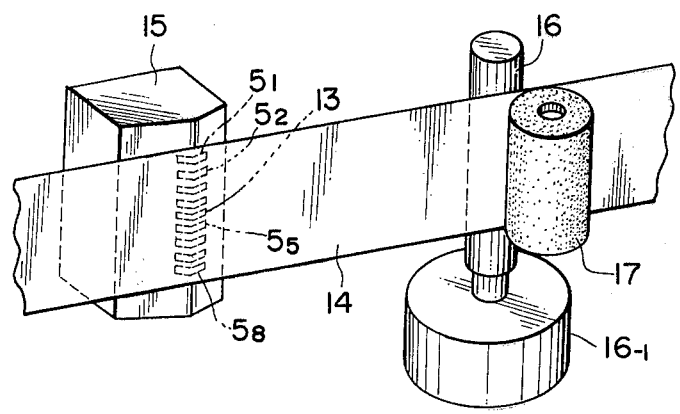

FIG. 3 is a schematic representation which serves to illustrate the position of the jitter component detection head used in the above-mentioned embodiment.

DESCRIPTION OF THE PREFERRED EMBODIMENT

With reference to the drawing, one embodiment of the present invention will be explained.

In FIG. 2, reference numeral 1 represents the input line, through which the input field signal is supplied. To this line, 1, a transformer such as a Hadamard Transformer, 2, is connected; this transformer, 2, consists of a resistance matrix, etc., and provides Hadamard Transformer signals into a number of channels, in this case, the number being eight.

The outputs of transformer, 2, are connected to frequency modulators, $3_1, 3_2 \ldots 3_8$. These frequency modulators, $3_1, 3_2 \ldots 3_8$, by FM modulating the carrier wave using the above-mentioned Hadamard Transformer Signals, produce FM carrier wave outputs.

The, the outputs from frequency modulators, $3_1, 3_2 \ldots 3_8$ are supplied to recording and reproducing magnetic heads, $5_1, 5_2 \ldots 5_8$, through record contacts, R-S, of change-over switches, $4_1, 4_2 \ldots 4_8$.

These magnetic heads, $5_1, 5_2 \ldots 5_8$, are connected to demodulators, $6_1, 6_2 \ldots 6_8$, through reproduction contacts, P-S, of the above-mentioned change-over switches, $4_1, 4_2 \ldots 4_8$. Also, the output terminals of these demodulators, $6_1, 6_2 \ldots 6_8$, are connected to one input terminal of each mixer $7_1, 7_2 \ldots 7_8$. The output terminals of mixers, $7_1, 7_2 \ldots 7_8$ are connected to time-base correctors, $8_1, 8_2 \ldots 8_8$. These time-base correctors, $8_1, 8_2 \ldots 8_8$ are for correcting the PM component of the jitter component, and they negate the jitter drift component present in the transformer signal itself, and the time-base aberrations between each channel.

The output terminals of the Time Base correctors, $8_1, 8_2 \ldots 8_8$, are connected to an inverse transformer, such as Hadamard Inverse Transformer, 9. This inverse transformer, 9, consists of a resistance matrix, etc., and from the output signals of the above-mentioned time base correctors $8_1, 8_2 \ldots 8_8$, the original field signal is reproduced and fed into output line, 10.

Reference numeral 11 represents an oscillator, which produces a fixed frequency output. The output terminal of this oscillator, 11, is connected to jitter detection head, 13, through record contact R-S of change-over switch, 12.

Jitter detection head, 13, records jitter caused by tape travel, using as a carrier wave the fixed frequency output of the above-mentioned oscillator, 11. In this case, jitter detection head, 13, is positioned to correspond with the centre of the width of magnetic tape, 14, as shown in FIG. 3, in order to obtain an average value for jitter.

The recording and reproducing magnetic head, $5_5$, which is positioned in close proximity to jitter detection head, 13, is especially chosen to record and reproduce the channel which is most easily affected by the jitter component signal (modulation noise), i.e., the low frequency component channel (for example D.C. 250 KHz) which contains the direct current component of the Hadamard Transformer signal. Whereas magnetic head $5_5$, corresponding to the channel easily affected by jitter, is positioned close to detection head, 13, magnetic heads, $5_1, 5_2, 5_3$, which correspond to channels not affected by jitter, are arranged in the magnetic head housing away from detection head, 13.

Also in FIG. 3, reference numeral 16 represents the capstan shaft, 17 represents the pinch roller, and $16_1$, the capstan drive motor.

In addition, with reference to FIG. 2, the above-mentioned head, 13, is connected to demodulator, 18, through reproduction contact, P-S, of change-over switch, 12. This demodulator, 18, demodulates the signal recorded by the above-mentioned head, 13, and produces only the jitter component as output.

The output terminal of demodulator, 18, is connected to inverter, 19, the purpose of which is to invert the jitter component output from demodulator, 18. The output of inverter, 19, is supplied to the other input terminals of the above-mentioned mixers, $7_1, 7_2 \ldots 7_8$, in order to mix the output of inverter, 19, with the outputs of the above-mentioned demodulators, $6_1, 6_2 \ldots 6_8$.

Next, the operation of the above-mentioned embodiment of the apparatus will be described.

Suppose that the apparatus is in the recording mode, with record contacts, R-S, of change-over switches, $4_1, 4_2 \ldots 4_8$ and 12, being closed.

In this condition, if the field signal is supplied through input line, 1, the eight channels carrying the Hadamard Transformer signals will be supplied through Hadamard Transformer, 2, and these signals will be supplied to freqyency modulators, $3_1, 3_2 \ldots 3_8$. The modulated carrier waves, which were FM modulated in the frequency modulators, $3_1, 3_2 \ldots 3_8$, by the transformer signal, are supplied to magnetic heads, $5_1, 5_2 \ldots 5_8$, through recording contacts R-S, of change-over switches, $4_1, 4_2 \ldots 4_8$, and recorded on magnetic tape (not shown in FIG. 2).

At the same time, the fixed frequency output of oscillator, 11, is supplied to head, 13, through recording contact, R-S, of change-over switch, 12. By this method, jitter caused by tape travel is recorded on the above-mentioned magnetic tape, using the above-mentioned fixed frequency output as a carrier wave.

Then, on closing reproduction contacts, P-S, of change-over switches, $4_1, 4_2 \ldots 4_8$ and 12, the apparatus is put into the reproducing mode. By this means, the reproducing outputs from magnetic heads, $5_1, 5_2 \ldots 5_8$, are supplied to demodulators, $6_1, 6_2 \ldots 6_8$, through reproduction contacts, P-S, of change-over switches, $4_1, 4_2 \ldots 4_8$. After the transformer signals have been demodulated, they are supplied to one input terminal of each mixer, $7_1, 7_2 \ldots 7_8$. On the other hand, reproduction output of magnetic head, 13, is supplied, through change-over switch, 12, to demodulator, 18, and demodulated. By this means, only the jitter component is supplied to inverter, 19, where it is pole-reversed and then fed to the other input of each of the above-mentioned mixers, $7_1, 7_2 \ldots 7_8$.

In the above-mentioned mixers, $7_1, 7_2 \ldots 7_8$, the AM component of tape travel jitter, which is included in the reproduced transformer signal on each channel, is detected and cancelled out by the above-mentioned pole-reversed jitter component signal.

Then, the outputs of mixers, $7_1, 7_2 \ldots 7_8$, are supplied to time-base correctors, $8_1, 8_2 \ldots 8_8$, and the jitter drift component, existing in each transformer signal itself and the time-base aberrations between each channel, is negated. The PM component is corrected and supplied to the Hadamard Inverse Transformer, 9, and the original field signal is then reproduced as the reproduction field signal and supplied to output line, 10.

Therefore, according to this arrangement, the jitter AM component which exists in the transformer signal, and the modulation noise caused by this AM component, is reliably detected. Thus, high quality reproduction field signals can be obtained.

As already mentioned, in the case of video recording and reproduction of the numerous Hadamard Transformer signals generated by the Hadamard Transformer System through a frequency modulation system, there is a channel which is especially easily affected by tape travel modulation noise. This is the channel which includes low frequency components such as direct current components.

But in this video-tape recording and reproducing apparatus, magnetic head $5_5$, which corresponds to the channel easily influenced by jitter, is positioned in close proximity to detection head, 13, and magnetic heads, $5_1$, $5_2$, $5_3$, which correspond to channels not influenced by jitter, are positioned away from detection head, 13.

Therefore, with regard to the channel easily influenced by jitter, the influence is reduced; and with regard to the other channels, because the signal frequency band and the modulation noise frequency band are dissimilar, a filter which passes only the required part of Hadamard Transformer signal after reproduction demodulation can be used.

In addition, the present invention is not limited to the above embodiment but can be modified within the scope of claim. For, example, in the above-mentioned embodiment eight channels are employed, but the present invention can be applied where a different number of channels is used. Also, in the above-mentioned embodiment, a Hadamard Transformation System is employed, but alternatively a Time-Sharing System can be used.

What is claimed is:

1. A video-tape recording and reproducing apparatus comprising a transformer system to divide the field signal into multi-channel transformer signals; a system to record and reproduce these multi-channel transformer signals using a multiple magnetic head; a jitter detection head to record and reproduce fixed frequency signals placed in juxtaposition with the above-mentioned magnetic heads; and a system to mix the jitter component signal produced by the jitter detection head, after pole reversal, into each channel of the above-mentioned transformer signal.

2. A video-tape recording and reproducing apparatus as set forth in claim 1 wherein the transformer system is a Hadamard Transformation System.

3. A video-tape recording and reproducing apparatus as set forth in claim 1 wherein the transformer system is a Time-Sharing System.

4. A video-tape recording and reproducing apparatus as set forth in claim 1 wherein a jitter detection head is positioned to correspond with the centre of the width of magnetic tape.

5. A video-tape recording and reproducing apparatus as set forth in claim 1 wherein the recording and reproducing magnetic heads which correspond with channels easily influenced by jitter component signals are positioned in close proximity to the jitter detection head.

6. An apparatus as in claim 1, wherein said mixing system includes polarity reversal means for reversing the polarity of the jitter signal and mixing means for mixing the reversed jitter signal with the signal in each channel, and wherein said channels each include a time base corrector for correcting the time base of each channel.

* * * * *